United States Patent [19]

Jelen

[11] Patent Number: 5,406,063
[45] Date of Patent: Apr. 11, 1995

[54] HAND-HELD DATA SCANNER HAVING ADJUSTABLE KEYBOARD PANEL

[75] Inventor: William M. Jelen, Akron, Ohio

[73] Assignee: Telxon Corporation, Akron, Ohio

[21] Appl. No.: 58,953

[22] Filed: May 7, 1993

[51] Int. Cl.⁶ .................. G06K 7/10; H03K 17/94
[52] U.S. Cl. .................... 235/472; 235/462; 341/22
[58] Field of Search .............. 235/462, 467, 472; 341/20, 34, 22; 345/169; 364/705.01, 709.1, 709.12

[56] References Cited

U.S. PATENT DOCUMENTS

| | | | |
|---|---|---|---|
| 4,158,194 | 6/1979 | McWaters et al. | 382/68 |
| 4,758,717 | 7/1988 | Shepard et al. | 235/467 X |
| 4,877,949 | 10/1989 | Danielson et al. | 235/462 |
| 5,144,302 | 9/1992 | Carter et al. | 341/20 |
| 5,157,687 | 10/1992 | Tymes | 235/472 X |
| 5,233,502 | 8/1993 | Beatty et al. | 364/709.1 |
| 5,237,161 | 8/1993 | Grodevant | 235/462 |

FOREIGN PATENT DOCUMENTS

| | | | |
|---|---|---|---|
| 2-306385 | 12/1990 | Japan | 235/472 |
| 3-248287 | 11/1991 | Japan | 235/435 |

*Primary Examiner*—Davis L. Willis
*Assistant Examiner*—Edward H. Sikorski

*Attorney, Agent, or Firm*—Pretty, Schroeder, Brueggemann & Clark

[57] ABSTRACT

A hand-held data entry device having both portable and fixed point-of-sale modes. The device includes a housing having a chassis for carrying a bar code scanner and a microprocessor-based system that stores inventory data relating to goods, and further having a removable and reversible panel for permitting a display and keyboard to be remounted in an upside-down orientation relative to the direction of scanning. In this manner, a pistol-grip handle used by the operator in the portable mode may be also used as a mount for the device in the fixed point-of-sale mode. In the fixed point of sale mode, the device is mounted thereby to a transaction device, such as a cash register, such that the scanner's beam of light is directed approximately vertically downward to scan the universal product code of goods that are passed below the scanner. Using opposing orientations of the panel, the keyboard and display may alternatively be viewed by the operator in each of the portable mode, when the operator scans away from his or her person, and the fixed point-of-sale mode, when the scanner is inverted to scan vertically downward. Preferably, the scanner is operator-actuated by a trigger on the pistol-grip when the device is used in employed in the portable mode, and in an object-sense mode when the device is employed in the fixed point-of-sale mode.

18 Claims, 3 Drawing Sheets

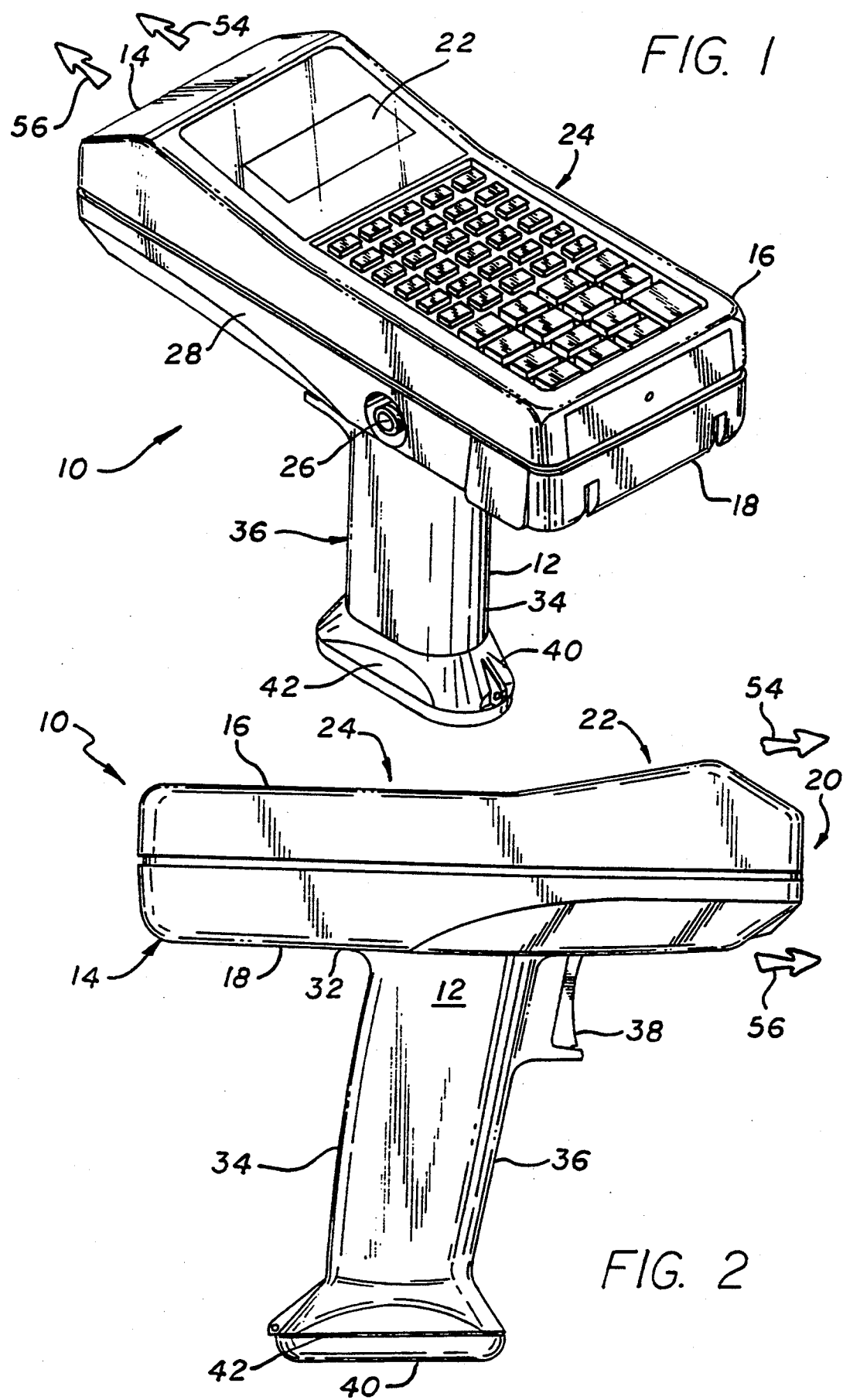

HAND-HELD DATA SCANNER HAVING ADJUSTABLE KEYBOARD PANEL

This invention relates generally to optical scanners of the kind that are useful in the retrieval of information stored in the form of bar codes and, more particularly, to portable optical scanners that can also be used as an element of a fixed point-of-sale transaction device.

BACKGROUND OF THE INVENTION

The use of optical scanners, and in particular, laser scanners, is common in many diverse businesses to expedite and at least partially automate many tedious and repetitive tasks. One typical example of the use of laser scanners is in the checkout of groceries where a Universal Product Code (UPC) is preprinted on the package of each grocery item in the form of a bar code. This code is scanned during checkout to identify each purchased item and to enable a computerized cash register that connects to the laser scanner to tally sales, print receipts, store information for inventory control and perform other computations upon the scanned data. With inventory knowledge as to which products have been purchased over periods of time, the grocery store can automatically calculate a day's sales, restock shelves, and order products for resupply, in anticipation of future sales.

Typically, these laser scanners are fixedly-mounted to a structure that permits the passage of code-bearing products within the range of the scanner. These fixedly-mounted laser scanners can either scan continuously or otherwise instantaneously detect the presence of a scannable product and initiate an object-sense scan for a fixed period of time.

However, a fixed mounting does not satisfy all of the potential uses for laser scanners. Portable laser scanners have also been developed, permitting mobile users to perform the aforementioned tasks, as well as other tasks.

For example, fixedly-mounted scanners typically require goods to be passed by a predefined space in a predefined manner, so that the bar code can be properly scanned. Often times, the predefined space is small, and fixedly-mounted scanners are required to be mounted in a predefined orientation. For example, in the grocery checkout implementation, laser-scanners are typically mounted with a vertical orientation, with goods moved past a predefined scanning space with the associated bar code correspondingly facing up or down. Portable laser scanners are not bound by this limitation, and therefore, may readily be used with large goods, heavy goods, stacked goods, etc., as well as with other objects. In fact, the use of bar code scanners of this type is by no means limited to grocery and retail stores, and find significant application to warehouse inventory control.

Typically, portable laser scanners are configured as hand-held units with pistol-type grips having a trigger-switch. A scanner is aimed at the bar code and a scan actuated by pulling the trigger. The scanning laser beam is then emitted from the front of the portable laser scanner, away from the user, and reflected back to the portable laser scanner, which detects and decodes the bar code.

In most typical uses, both fixed-mount and portable scanners periodically require additional inputs from the user, e.g., identifying the quantity of items that correspond to the one item currently being scanned, or marking the completion of inventory on a particular warehouse area. Keyboards are typically used for these inputs, and multi-character visual displays also are used adjacent to the keyboard, both to confirm these inputs as well as to view other, stored data. In the case of portable scanners, the keyboard is typically mounted upon the top surface of the scanner with its keys oriented in a direction of normal reading with respect to the user, i.e., alphanumeric indicia represented upon the keyboard and visual display are shown as upright, and not rotated or upside down, or otherwise displayed in a manner that would render their interpretation and use difficult.

Thus, portable laser scanners find their primary use as hand-held devices to read bar code labels attached to a wide variety of objects. When one adds a computer with memory, and a keyboard with display to a portable hand-held scanner, the result is a bar code scanning, data-acquisition and storage device. The operator of the device can then manually enter and edit data through the keyboard. When configured in this manner, the end product is a portable transaction and inventory computer.

It would be desirable to have a portable scanner that could alternatively be used as part of a fixed point-of-sale transaction device, such as a cash register, and thus, which would have a large variety of practical applications. Such a device could easily be adapted to the retail environment, thereby simplifying repair and maintenance of the point-of-sale transaction device.

Unfortunately, application of portable scanners to a fixed point-of-sale environment, and application to fixed-mount scanners to an inventory control environment continue to quite limited, and the two types of scanners are for the most part distinct. As mentioned, conventional portable laser scanners typically feature a laser which is directed away from the user. However, the keyboard and display are oriented toward the user, who may thereby view the display and enter data. If one were to use a portable laser scanner in a conventional, fixedly-mounted environment, with the scanning occurring vertically downward toward the goods so that the laser beam is not reflected and scattered about the store, the orientation of the display and keyboard would render them practically unusable. For example, in many grocery check-out implementations, both the keyboard and display would be upside-down and could only with difficulty be read by a retail clerk. Additionally, even if one could tolerate the misorientation of the display and keyboard, the scanning would only occur when the trigger was depressed as an object-sense mode would not normally be present with a portable scanner, and it would be difficult for the retail clerk to operate the trigger.

To adapt a portable scanner to the point-of-sale environment, one would have to fasten a portable hand held scanner securely to a base, with the laser beam directed away from the operator. To read a bar code label affixed to an object, the operator would then have to reach awkwardly across the scanner and place the object behind the scanner to intercept the laser beam. If the device was mounted such that the laser beam projects parallel to the floor surface, the system would be undesirable for use in a large department store, because the laser beam might be reflected about the store.

Thus, what is needed is a portable laser scanner that can additionally be made to function as a fixedly-mounted scanner by adapting the configuration of the display and keyboard to an altered work environment.

Additionally, such a scanner should automatically adapt to the different orientations by either scanning in response to a trigger depression or in an 'object-sense' mode in response to a scannable item entering its scanning field, for portable and fixedly-mounted scanners, respectively. The present invention solves these needs and provides further related advantages.

SUMMARY OF THE INVENTION

The present invention solves the aforementioned problems by providing a hand-held data entry device that has both a portable mode, where an operator uses the hand-held device as a portable, hand-held bar code scanner, and also a fixed point-of-sale mode, where the hand-held device is fixedly-mounted to scan downwardly, and a display reconfigured to be easily accessible to an operator. Using the teachings of the present invention, bar code scanners of cash registers, and other fixed transaction devices, may be quickly and easily removed and replaced, or made personal to the employee. Practically speaking, it provides a greater field of applications to hand-held data entry devices.

The present invention provides a hand-held data entry device that includes a housing, having a chassis that mounts an optical bar code scanner and a data processor and memory that stores bar code data received from the scanner, and a panel that mounts an operator interface that may include a display and keyboard, and that is adjustably-mounted to the chassis. Thus, the scanner may be directed to scan different spaces in relation to the operator and the panel adjusted to provide a normal reading orientation.

The display and keyboard may have associated alphanumeric indicia printed on or adjacent to the keys, in the case of the keyboard, and electronically displayed upon the display. In the preferred embodiment, the adjustable mounting is in the form of a reversible coupling that permits the panel to be replaceable in either of two, 180-degree-opposite orientations, and thus is remountable depending upon the mode employed for the hand-held data entry device. In the portable mode, the scanner is trigger-actuated by (a trigger mechanism of) a pistol-grip by which the operator holds the portable unit. In the fixed point-of-sale mode, the scanner is preferably run in an 'object-sense' mode wherein it periodically scans briefly to determine the presence of an adjacent object, and continues scanning to check for the presence of a bar code, if an object has been sensed. Once an amount of time sufficient for scanning of the bar code has elapsed, the scanner resumes is periodic brief scans to detect the presence of another object.

BRIEF DESCRIPTION OF THE DRAWINGS

FIG. 1 is a perspective view of a hand-held data entry device which embodies the features of the present invention, showing a housing, antenna, keyboard, display, and a pistol-type grip that an operator uses to hold the device.

FIG. 2 is a side view of the preferred hand-held data entry device of FIG. 1, showing the upper half, or panel, of the housing attached to the lower half, or chassis, of the housing, for use of the device in the portable mode.

FIG. 6 also shows a panel set of electrical contacts, which are adapted to contact one of two redundant chassis sets of electrical contacts, to establish electrical connection between the panel and chassis in either of two orientations.

DESCRIPTION OF THE PREFERRED EMBODIMENT

Figure 3:
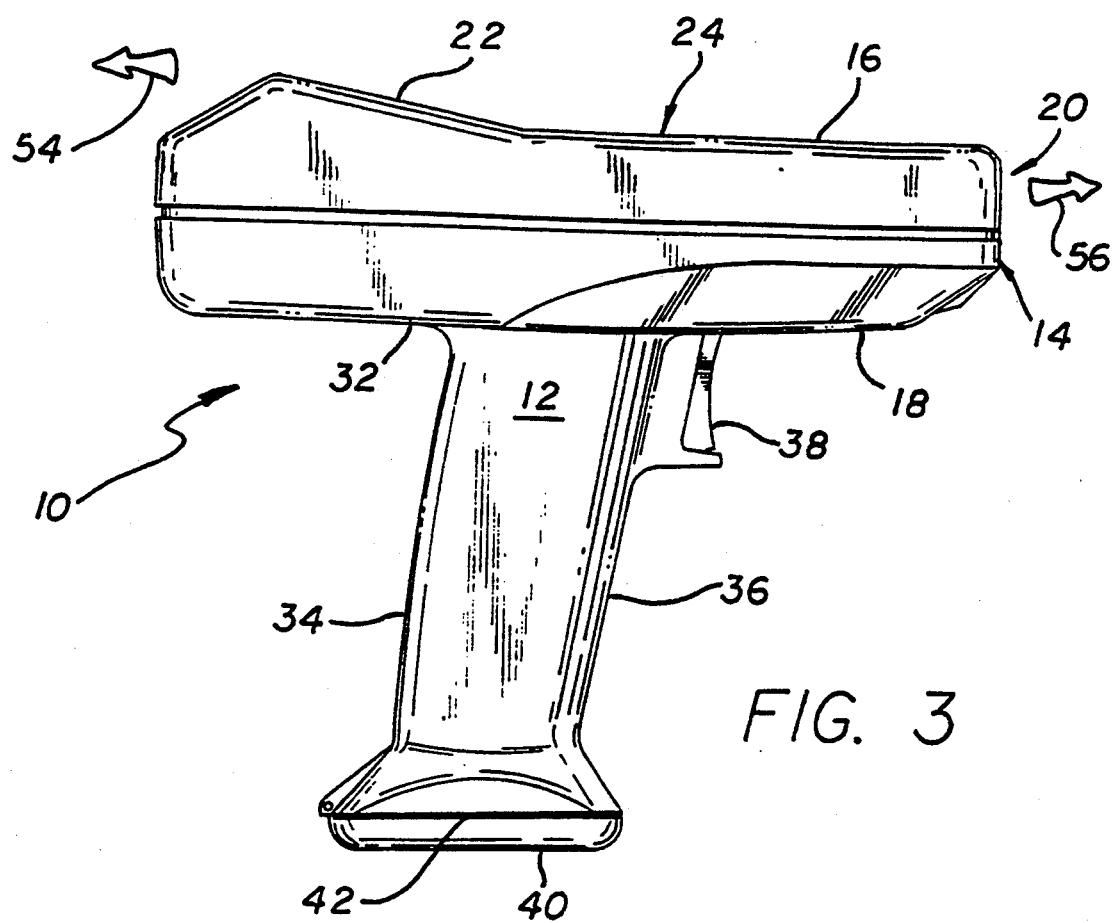
FIG. 3 is another side view of the preferred hand-held data entry device, similar to FIG. 2, but which shows the panel reversed in its attachment to the chassis, for use of the device in the point-of-sale mode.

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of a hand-held data entry apparatus which was summarized above and which is defined in the enumerated claims.

A. OVERVIEW OF THE MODES OF OPERATION AND OF THE PRINCIPAL PARTS

In accordance with the principles of the invention, the preferred embodiment is a hand-held data entry device having a portable mode of operation, where an operator may move about with the device and use it scan bar codes of goods or other objects that are not practically movable to a point-of-sale scanning device. The device also has a fixed point-of-sale mode wherein the hand-held data entry device is fitted to a point-of-sale transaction device, such as a cash register, in a predefined orientation to scan goods passed by it.

FIG. 1 shows a perspective view of the device 10, which has a vertically disposed pistol-grip 12 by which the operator may portably grip the unit, with his or her hand, and a rectangular, box-shaped housing 14, which houses some of the electronic circuitry used to support scanning operations. The housing 14 is composed of three rigid plastic pieces, including an upper half or panel 16, a lower half or chassis 18, and a clear plastic front window 20 rigidly affixed to lower half 18, through which the scanning occurs. In accordance with well-known principles of bar code scanning, the scanning is performed by a so-called 'laser engine.' This laser engine, disposed to scan linearly back and forth about a central optical axis that is also the central longitudinal axis of the housing 14, sweeps a 1.0 milliwatt semiconductor laser across an image plane to detect and scan a bar code. Consequently, unlike older bar code scanners, the preferred embodiment does not require relative motion between the device 10 and bar codes that are to be scanned.

The device 10 also includes a data processor, having associated memory for storing decoded bar code information, and radio frequency (rf) circuitry for communicating with a remote host computer, as is well known in the art. The operator may communicate with the data processor by means of an operator interface, which includes both of a multi-character liquid crystal display 22 and also keyboard 24 which are mounted to the concave, downwardly-facing interior of the panel 16 to protrude through openings in the upwardly facing portion of the panel to be viewable by the operator. For supporting the radio frequency communications, a coaxial antenna jack 26 is mounted through one lateral side 28 of the chassis for mounting an L-shaped antenna 30 (seen in FIG. 4), which may be rotated in relation to the housing as desired.

As best seen in FIG. 2, the pistol-grip 12 extends downwardly from a base 32 of the chassis and is generally cylindrical in shape. The pistol-grip mounts within its interior at the rear end 34 the rf communications circuitry, which couple the data processor and the coaxial antenna jack 26, and mounts within its fore end 36 two rechargeable nickel-cadmium batteries which supply power to the device 10 during use in scanning or manual entry of data to the keyboard 24. At the fore end 36 of the pistol-grip is an operator-controlled momentary scan switch, which is configured as a spring-biased trigger 38. Thus, when the device 10 is operating in the portable mode, the operator controls the scanner in momentary fashion, at times when the operator depresses the trigger 38. The pistol-grip 12 is mounted through the upwardly facing concave interior of the chassis 18 and is supported therein by a horizontally extending flange (not shown) that is wider than an opening through the base 32 of the chassis through which the pistol-grip is inserted during assembly. A set of screws (not shown), securely fastens the pistol-grip 12 to the chassis 18.

Figure 4:
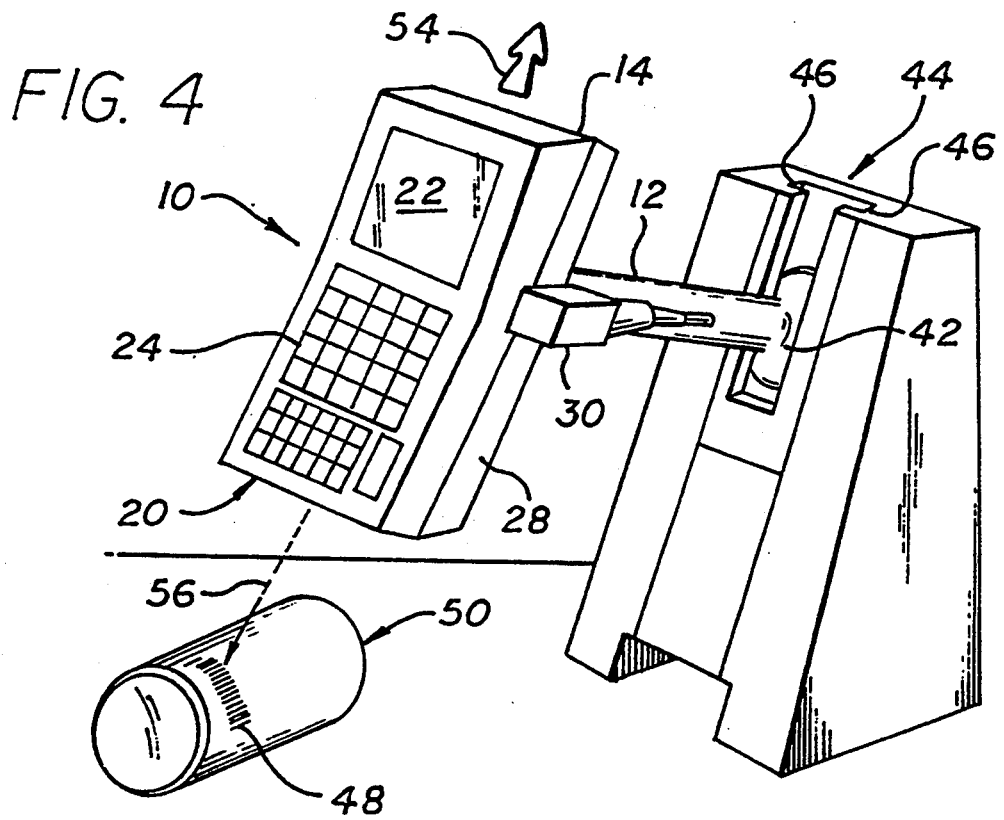
FIG. 4 is a perspective view of the hand-held data entry device of FIG. 1, as used to scan goods in the point-of-sale mode. The device is installed upside-down in a point-of-sale mount, with the keyboard and display inverted to be normally readable by an operator.

A bottom end 40 of the pistol-grip 12 has a flanged periphery 42, such that the device 10 may be inserted into a point-of-sale mounting 44 during use in the point-of-sale mode, as best seen in FIG. 4. The point-of-sale mounting 44 is merely a slot having transversely extending interior grooves 46 that retain the device 10 in fixed downwardly-facing orientation, such that scanning is directed approximately vertically downward, at a 30-degree deviation from the direction of gravity, to scan the bar code 48 of goods 50 passed beneath the device 10.

The panel 16 is coupled to the chassis 18 by means of four easily removable connectors that are vertically inserted upwardly through the base 32 of the chassis into downwardly-facing threaded receptacles (not shown) within the panel. In addition, as further described below, the panel 16 is electrically coupled to the chassis 18 by a mounting 52 that is permits positioning of the panel with respect to the chassis in a number of orientations.

Figure 5:
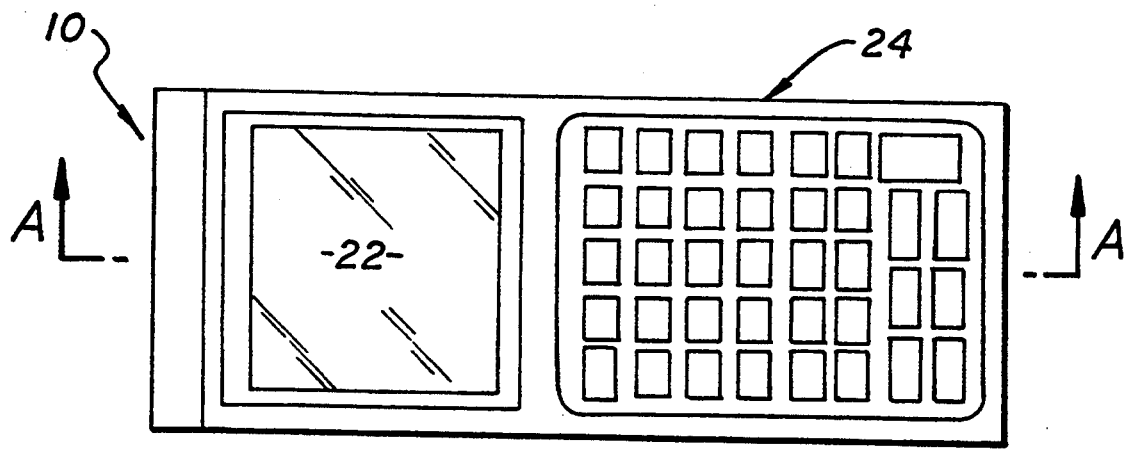
FIG. 5 is a plan view of the hand-held data entry device of FIG. 1, showing the display and keyboard, which are mounted upon a panel on the top side of the device.

As best seen in FIGS. 4 and 5, the display 22 and the keyboard 24 have normal reading orientations, that is, 90-degrees counterclockwise from the normal left-to-right reading of alphanumeric indicia that are permanently displayed on or adjacent to the keys of the keyboard, and that are electronically displayed upon the display. Otherwise stated, the normal reading orientation is direction toward the 'top' of the alphanumeric indicia, and is illustrated by the arrow designated by the reference numeral 54 in each of FIGS. 1–5. In accordance with the principles of the invention, this preferred embodiment permits two, 180° opposite orientations to permit normal viewing by the operator of the display 22 and the keyboard 24 in each of the portable and point-of-sale modes of operation. In the portable mode, the panel 16 is mounted to the chassis 18 as shown in FIGS. 1 and 2 with the normal reading orientation of the display 22 and the keyboard 24 aligned in the direction of scanning, illustrated by the arrow designated by the reference numeral 56. In the point-of-sale mode, with scanning occurring vertically downward as shown in FIG. 4, the panel 16 is reoriented to provide a normal reading orientation opposite to the direction of scanning. Thus, the mounting 52 is an adjustable mounting that electrically permits either orientation of the panel 16, as best illustrated in FIGS. 2 and 3.

B. PHYSICAL LAYOUT OF THE ELECTRONIC COMPONENTS OF THE PREFERRED HAND-HELD DATA ENTRY DEVICE

The chassis 18 rigidly mounts two boards, respectively, the data processor (and resident memory) and the laser engine. The data processor board features a number of jumper connections between it and other boards, including a connection to each of the trigger 38, and to the laser engine to actuate scanning. The laser engine, as is well-known in the art, includes a printed circuit board that mounts the 1.0 milliwatt semiconductor laser and an oscillating mirror that reflects and sweeps the laser through the window 20 across a space that is to be scanned for a bar code. This board is mounted at an angle such that the reflected, sweeping beam is unobstructed within the housing 14 and impinges upon the selected space.

The laser beam is actually reflected by a central portion of the oscillating mirror, with an outer portion of the mirror adapted to reflect return light from the scanned space onto a light sensor that produces an electronic signal, representative of whether the scanned space is light or dark. Since bar codes are made up of alternating white and black bars of varying relative width, relative durations of the electronic signal are used to produce digital values, or numbers, that are represented by the bar code. The data processor, which may be any microprocessor-based system, stores this numerical data in its memory for later download to the remote host computer, either through rf communication or by a physical electronic link through a jack in the bottom end 40 of the pistol-grip 12. Thus, the data processor board is mounted just adjacent to the laser engine board within the chassis 18.

In addition to coupling to the laser engine board and the trigger 38, the data processor also has jumper connections to the nickel cadmium batteries to monitor their level and charging status, to the rf circuitry located within the rear end 34 of the pistol-grip, and to the aforementioned jack (not shown) in the bottom end 40 of the pistol-grip, for communication to the remote host computer.

As with any other microprocessor-based system, the data processor includes a microprocessor, program memory and data memory, the latter being used to store bar code data. The program memory stores software that controls microprocessor operation, including operations that (1) send data to the display and scans the keyboard for data from the operator, (2) interface with the remote host computer via either of the rf communications or the jack, (3) actuate the laser engine, and decode numeric information from digital information representative of white/black relative length and black/white line relative length, (4) monitor status of the device, including low-battery, battery charging, scan in progress and good scan signals, and (5) control the mode of the device 10, either automatically in response to orientation of the panel 16, or in response to operator command. For example, if the device is being used in the portable mode, the microprocessor commands scans for only the duration that the trigger 38 is depressed by the operator. Alternatively, scanning is actuated by the microprocessor in an 'object-sense' mode when the device 10 is used in the point-of-sale mode. In this latter mode, the laser engine is actuated in only briefly to determine the presence of a reflective object within the space scanned. If an object is detected within the range of the sweeping beam, the microprocessor then directs the laser engine to sweep continuously for an interval of time sufficient to read the detected bar code.

The data processor also couples to the display 22 and the keyboard 24 for communication with the operator. However, since the panel 16 upon which the display and keyboard are mounted is reversible in orientation, a wire connection is not used between these elements. Instead, a number of rigidly-mounted electrical contacts are provided, as seen in FIG. 6, for electrically coupling the panel 16 and the chassis 18 in each permitted orientation.

Figure 6:
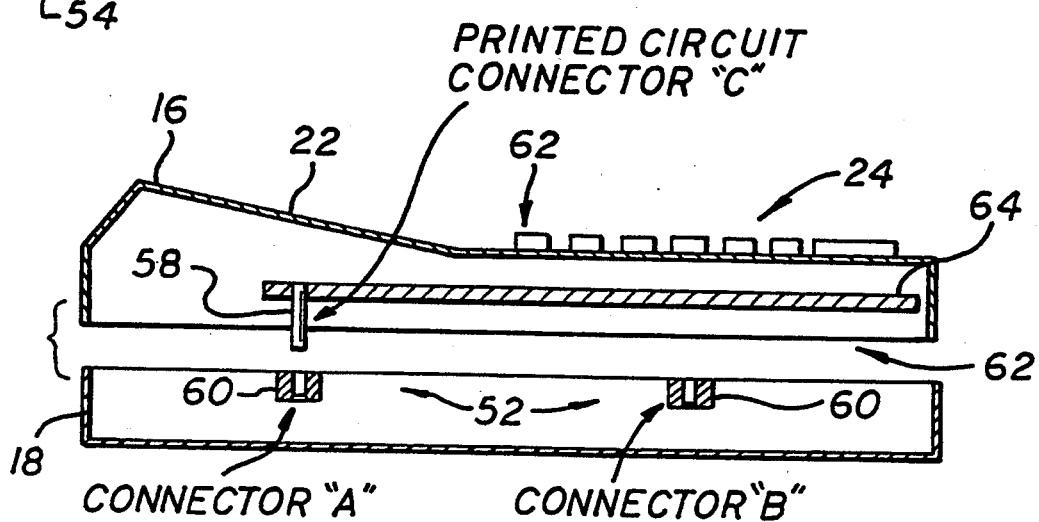
FIG. 6 is a cut-away side view of the housing of the hand-held data entry device of FIG. 5, taken along lines A-A, and shows separated panel and chassis portions of the housing of the device.

The preferred implementation of these contacts, seen in FIG. 6, are in two mating sets of contacts, respectively, a panel set 58 of electrical contacts that downwardly-extends from the panel 16 within its concave interior, and a receiving chassis set 60 of electrical contacts that is rigidly-mounted to the chassis and extends upwardly therefrom. The chassis set 60 is connected by jumpers to the data processor board and actually consists of a redundant pair of contacts, labelled Connector A and Connector B, respectively, which are identical in construction and are mirrored about the longitudinal center of the panel, along the normal reading orientation. The longitudinal center is designated by the reference numeral 62 in FIG. 6.

Each set 58 and 60 of contacts includes a plurality of metallized contacts that establish electrical connection in parallel format between a display driver (not shown) and keyboard 24 and the data processor. These contacts include twenty pins that represent a data bus, power, ground, power on/off, and selection lines that address communications from the data processor board to either the display or to a keyboard buffer that gates key information onto the data bus. Accordingly, whether the normal reading orientation is oriented with the direction of scanning or opposite it, the respective connectors of the chassis set 60 of contacts are oriented in a manner to line up their metallized contacts with the corresponding ones of the metallized contacts of the panel set 60. The panel set 58 of contacts is rigidly-mounted by a printed circuit board 64 that addresses communications to either of the display driver (not shown) and thereby to the display 22, or to the keyboard buffer in order that the data processor may gate key information onto the data bus and thereby scan the keyboard.

The panel set 60 of contacts includes a bias pin (set at a logical '1') that informs the data processor of the orientation of the panel 16. Accordingly, the data processor is controlled by the software to automatically toggle, depending upon the orientation of the panel 16, between directing the laser engine to perform a trigger-actuated scan mode and an object-sense scan mode, when the device 10 is used in the point-of-sale mode.

Thus, when an operator desires to adapt the device 10 for operation in either the portable or point-of-sale modes, the operator need only adapt the orientation of the panel 16 to be most easily readable by the operator, who views the display 22 and keyboard 24 along their common normal reading orientation. When thus installed onto the chassis 18, the panel set 58 of electrical contacts (labelled Connector C in FIG. 6) will necessarily be appropriately interfaced with one of the redundant set of chassis contacts 60, e.g., Connector A or Connector B, and appropriate electrical connection between the operator interface and the data processor established. The easily removable connectors are then tightened by the operator and the device is ready for operation in the desired mode. To change the mode, the easily removable connectors are removed, and the panel 16 and the easily removable connectors are reinstalled in the opposite orientation.

C. THE CONTEMPLATED ALTERNATIVE EMBODIMENT OF FIG. 7

Figure 7:
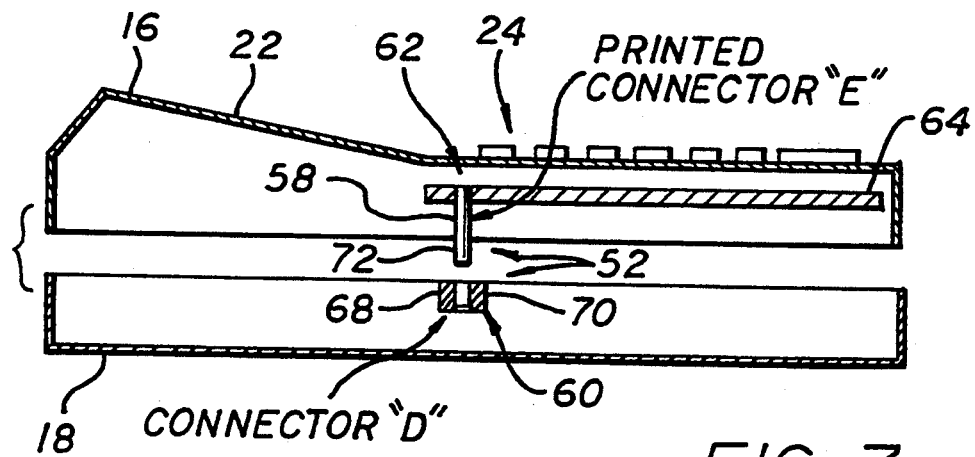
FIG. 7 is a cut-away view of an alternative embodiment of the hand-held data entry device, similar to FIG. 6, but showing a single set each of the panel set and chassis set of electrical contacts, adapted to establish electrical contact in either of two orientations.

FIG. 7 illustrates a contemplated second embodiment of the present invention having a different configuration of electrical contacts. The panel set of electrical contacts 58 consists of a centrally-mounted Connector E that is affixed downwardly beneath the printed circuit board 64 and that is adapted to mate with a centrally-mounted chassis set 60 of electrical contacts, designated Connector D. Two available options to this installation are to use (1) redundant contacts within Connector D at opposite fore and aft sides 68 and 70 of the connector, with Connector E having metallized contacts only upon one side 72 of the connector, or alternatively, (2) the bias pin, not only to indicate orientation of the panel 16, but also to indicate orientation of the connectors for appropriate reading of the data bus. For example, each of the fore and aft sides 68 and 70 may be configured to have two power and two ground contacts that are mirror-opposites, and data pin contacts of interpreted significance that depends upon the bias contact. For example, if there are twelve metallized contacts on each of the fore and aft sides 68 and 70 of Connector D, numbered in clockwise fashion, the least and most significant contacts could be reserved for bias and power, the middle contacts for ground and peripheral selection, and all other contacts for data of significance to be ascribed by the microprocessor, depending upon location of the bias signal at either the most or least significant contacts.

It will be appreciated that since the panel 16 is reversible in orientation, each contact must be made to occur in mirrored locations about each of the longitudinal center (extending through FIGS. 6 and 7 at the location of the reference numeral 62) and a transverse center, shown by the line A—A in FIG. 5.

Having thus described several exemplary embodiments of the invention, it will be apparent that various alterations, modifications, and improvements will readily occur to those skilled in the art. For example, the liquid crystal display could be electronically inverted in lieu of physical inversion of the panel.

Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

I claim:

1. A hand-held data entry apparatus usable to scan a space in both a portable mode, where an operator uses said apparatus as a mobile hand-held scanner to scan the space, and a fixed point-of-sale mode, where said apparatus is mounted in a fixed orientation to scan the space, which is generally fixed and through which goods are passed, said hand-held data entry apparatus comprising:

a housing having
a chassis that mounts an optical bar code scanner that is selectively actuated to scan an adjacent space, about an optical axis, and to read bar code data of goods located in the space,
a panel, and
a mounting that mounts said panel to said chassis; and
a data processor and memory within said housing and coupled to said optical bar code scanner to receive and store the bar code data;
a display mounted on said panel and having a normal reading orientation of alphanumeric indicia associated therewith;
a keyboard mounted on said panel and having the same normal reading orientation of alphanumeric indicia associated with said keyboard as does said display; and
wherein said mounting mounts said panel to said chassis to permit said normal reading orientation to selectively have at least two different orientations with respect to said optical axis, including a first orientation that generally faces the bar code data and a second orientation that faces substantially away from the bar code data to thereby permit a vertically erect operator to read said display and said keyboard when said optical axis faces substantially in a vertically-downward extending direction.

2. A hand-held data entry apparatus according to claim 1, wherein:
said hand-held data entry apparatus further comprises
a handle mounted to said chassis that permits an operator to hold said housing and to arbitrarily direct said optical axis, and
a point-of-sale mount whereby said housing may selectively be mounted in a fixed orientation when said hand-held data entry apparatus is used as a fixed point-of-sale scanner, Such that said optical axis vertically extends downwardly in a direction of scanning such that said scanner reads the bar codes of goods passed below it; and
said mounting alternatively permits physically-reversible mounting of said panel in each of two opposite orientations in both of which the normal reading orientation is generally parallel to said optical axis.

3. A hand-held data entry apparatus according to claim 1, wherein:
said data processor is electrically coupled to said scanner to control actuation of said scanner; and
said hand-held data entry apparatus further comprises data processor software that permits operator-selection via said keyboard of a continuous scan mode, in which said scanner continuously scans the space.

4. A hand-held data entry apparatus according to claim 1, wherein:
said data processor is electrically coupled to said scanner to control actuation of the same; and
said hand-held data entry apparatus further comprises data processor software that selectively directs an object-sense scan mode, in which said scanner periodically scans the space to determine the presence of a bar code and is actuated in response to the determined presence of a bar code, to immediately thereafter scan the space continuously throughout a finite interval of time.

5. A hand-held data entry apparatus according to claim 1, further comprising an operator-actuated scan switch that is operatively coupled to said scanner to actuate the same to scan the space at times when said switch is closed.

6. A hand-held data entry apparatus according to claim 1, wherein:
said data processor is electrically coupled to said scanner to control actuation of the same; and
said hand-held data entry apparatus further comprises data processor software that directs an object-sense scan mode when said hand-held data entry apparatus is used in the fixed point-of-sale mode, in which said scanner periodically scans the space to determine the presence of a bar code and is actuated in response to the determined presence of a bar code, to immediately thereafter scan the space continuously throughout a finite interval of time, and
an operator-actuated scan switch that is operatively coupled to said scanner to actuate the same to scan the space at times when said switch is closed when said hand-held data entry apparatus is used in the portable mode.

7. A hand-held data entry apparatus according to claim 1, further comprising:
an electromagnetic wave transceiver having an antenna, said transceiver electrically coupled to said data processor and controlled thereby; and
wherein said housing has an antenna mount that mounts said antenna externally upon said housing.

8. A hand-held data entry apparatus according to claim 1, wherein:
said panel includes a panel set of electrical contacts mounted upon said panel;
said chassis includes a chassis set of electrical contacts mounted upon said chassis, each of said electrical contacts of said chassis set adapted to contact a corresponding one of said electrical contacts of said panel set to establish associated electrical connections between said data processor and said keyboard and display; and
wherein said associated electrical connections between ones of said chassis set of electrical contacts and corresponding ones of said panel set are established in each of said different orientations when said panel is mounted to said chassis.

9. A hand-held data entry apparatus according to claim 8, wherein:
said panel is mounted on top of said chassis and is detachable therefrom;

said mounting is selectively physically reversible, and alternatively permits attachment of said panel in each of two opposing orientations;

said panel has a longitudinal center of said normal reading orientation, that extends along a transverse line perpendicular to said normal reading orientation;

said panel set of electrical contacts is mounted vertically below said panel and extends downwardly towards said chassis, said panel set being symmetrically mounted about said longitudinal center;

said chassis set of electrical contacts is also symmetric about said longitudinal center and extends upwardly from said chassis toward said panel to contact said panel set of contacts and thereby establish said electrical connections when said panel is mounted to said chassis.

10. A hand-held data entry apparatus according to claim 9, wherein:

said panel has a transverse center of said normal reading orientation, that extends along a longitudinal line parallel to said normal reading orientation; and said panel set and chassis set is each mounted at approximately both of said longitudinal center and said transverse center, such that said electrical connections are established at approximately both of the longitudinal center and the transverse center.

11. A hand-held data entry apparatus according to claim 9, wherein:

said panel has a transverse center of said normal reading orientation, that extends along a longitudinal line parallel to said normal reading orientation; and at least one of said panel set and said chassis set includes two redundant sets of contacts reflected about both of said longitudinal center and said transverse center, each one of said two redundant sets of contacts alternately contacting the other (of said chassis set and said panel set) in both of said two opposing orientations.

12. A hand-held data entry apparatus used by an operator to scan data represented at the exterior of an object and generally occupying an image plane, said hand-held data entry apparatus comprising:

a scanner that is spatially positionable at a distance from the object, along an optical axis that intersects the image plane and in a direction of scanning along said optical axis toward the object, said scanner being selectively actuated to thereby read said data from the object;

a data processor including a memory, said data processor operatively coupled to said scanner to receive data which has been read from the object and that stores said data in said memory;

an operator interface operatively coupled to said data processor, said operator interface including at least one of a keyboard and a display, said one of the keyboard and the display having alphanumeric indicia that are displayed thereon and that define a normal reading orientation;

wherein said data processor is operatively coupled to said one of the keyboard, to thereby accept operator data from the keyboard that modifies or supplements said stored data, and the display, to thereby drive the display to display stored data;

a mounting that mounts said operator interface such that said normal reading orientation may selectively be oriented with respect to the direction of scanning in both of a first orientation, wherein said normal reading orientation is generally parallel to said optical axis and aligned to face toward the object, and a second orientation, different from the first, wherein said normal reading orientation is generally parallel to said optical axis and is aligned to face substantially away from the object.

13. A hand-held data entry apparatus according to claim 12, wherein said scanner is positioned, when said mounting is in said second orientation, such that the direction of scanning extends vertically downward within approximately thirty degrees of the direction of gravity, the image plane being substantially horizontally disposed, and said normal reading orientation extends generally vertically upwards, such that a vertically erect operator with his or her head vertically elevated adjacent said operator interface may read the alphanumeric indicia.

14. A hand-held data entry apparatus according to claim 12, wherein:

said hand-held data entry apparatus further comprises a housing, including a window through which said scanner is selectively actuated to scan the exterior of the object, said housing also including a chassis that mounts said scanner and said data processor, and a removable and reversible panel that mounts said operator interface, said mounting connecting said chassis and said removable and reversible panel; and said mounting includes a set of electrical contacts that electronically couples said operator interface and said data processor in either of two opposing orientations, such that said removable and reversible panel may selectively and alternatively be attached to said chassis in either of two one-hundred-and-eighty-degree-opposite orientations.

15. A hand-held data entry apparatus according to claim 14, wherein:

said housing is box-shaped, having two lateral sides, a top side, a bottom side, a front side and a rear side;

said window forms at least a part of said front side;

said removable and reversible panel forms at least part of said top side;

said hand-held data entry apparatus further comprises an operator-grip mounted to said chassis, said operator-grip generally cylindrically shaped and extending downward from said chassis, said operator-grip having two opposing ends including a chassis-mounting end and an opposing, bottom end, and a trigger that is electronically coupled to said scanner and which causes actuation of the same when depressed by the operator; and said opposing, bottom end is of a construction that permits said opposing, bottom end to be mounted to a fixed point-of-sale transaction apparatus and rigidly support said hand-held data entry apparatus with respect thereto.

16. A hand-held data entry apparatus according to claim 12, wherein:

said operator interface includes both of the display and keyboard, both having alphanumeric indicia displayed in said normal reading orientation;

said data processor is operatively coupled to both of the keyboard, to thereby accept operator data from the keyboard that modifies or supplements said stored data, and the display, to thereby drive the display to display stored data.

17. A hand-held data entry apparatus usable in both portable and fixed point-of-sale environments, comprising:

scanning means for scanning a bar code and producing digital data representative of the bar code;

digital processing means for processing said digital data and for storing the same;

operator interface means for providing communication between an operator and said digital processing means, said user interface means having a normal reading orientation for displayed alphanumeric indicia associated therewith; and adjustable alphanumeric indicia display means for rigidly mounting said user interface means with respect to said scanning means, and for permitting variance between at least two alternative orientations of said displayed alphanumeric indicia, one such that the normal reading orientation generally faces the bar code, and the second such that the normal reading orientation generally faces away from the bar code.

18. A hand-held data entry apparatus according to claim 17, further comprising hand-held data entry apparatus mounting means for selectively mounting said scanning means in a fixed orientation at a point-of-sale transaction device.

* * * * *